United States Patent
Nakamura et al.

[11] Patent Number: 6,103,213
[45] Date of Patent: Aug. 15, 2000

[54] PROCESS FOR PRODUCING LITHIUM-COBALT OXIDE

[75] Inventors: Tatsuya Nakamura, Hiroshima; Hideaki Sadamura, Onoda; Mitsuaki Hatatani, Ube; Akihisa Kajiyama, Otake; Yoshiro Okuda, Hiroshima, all of Japan

[73] Assignee: Toda Kogyo Corporation, Hiroshima-ken, Japan

[21] Appl. No.: 09/045,542

[22] Filed: Mar. 23, 1998

[30] Foreign Application Priority Data

| Mar. 25, 1997 | [JP] | Japan | 9-091502 |
| Mar. 25, 1997 | [JP] | Japan | 9-091503 |
| Sep. 2, 1997 | [JP] | Japan | 9-254157 |

[51] Int. Cl.$^7$ .......................... C01B 13/14; C01G 49/00; H01M 6/14
[52] U.S. Cl. ............................ 423/592; 423/594; 429/194
[58] Field of Search ..................... 423/592, 593, 423/594; 429/57, 59, 53, 54, 56, 194, 128, 233

[56] References Cited

U.S. PATENT DOCUMENTS

| 2,545,424 | 3/1951 | Ellestad et al. | |
| 4,049,027 | 9/1977 | Seiger | 141/1.1 |
| 4,491,637 | 1/1985 | Hastig et al. | 502/66 |
| 5,302,199 | 4/1994 | Prengel et al. | 106/417 |
| 5,378,560 | 1/1995 | Tomiyama | 429/217 |
| 5,503,930 | 4/1996 | Maruyama et al. | 428/402 |
| 5,523,182 | 6/1996 | Ovshinsky et al. | 429/223 |
| 5,538,814 | 7/1996 | Kamauchi et al. | 429/218 |
| 5,593,856 | 1/1997 | Choi et al. | 435/68.1 |
| 5,618,640 | 4/1997 | Idota et al. | 429/194 |
| 5,654,114 | 8/1997 | Kubota et al. | 429/218 |
| 5,686,203 | 11/1997 | Idota et al. | 429/194 |
| 5,705,296 | 1/1998 | Kamauchi et al. | 429/218 |
| 5,707,756 | 1/1998 | Inoue et al. | 429/57 |

FOREIGN PATENT DOCUMENTS 0 735 004 A1  10/1996  European Pat. Off.

OTHER PUBLICATIONS

Browning, Jon E. Agglomeration: Growing Larger in Applications and Technology. pp. 147–169, Dec. 4, 1967.
Patent Abstracts of Japan vol. 096, No. 002, Feb. 29, 1996 & JP 07 262995A Nippon Chem Ind. Co. Ltd.
Patent Abstracts of Japan vol. 095, No. 011, Dec. 26, 1995 & JP 07 220723A Sumitomo Chem Co. Ltd. Aug. 18, 1995.

*Primary Examiner*—Tom Dunn
*Assistant Examiner*—Cam N. Nguyen
*Attorney, Agent, or Firm*—Nixon & Vanderhye P.C.

[57] ABSTRACT

A process for producing lithium-cobalt oxide, comprises: mixing cobalt oxide having a BET specific surface area of 30 to 200 m$^2$/g or an average particle size of not more than 0.1 μm, with a lithium compound; and calcining the obtained mixture at a temperature of 500 to 850° C. Such a process for producing lithium-cobalt oxide particles is useful especially as a cathode active substance for lithium ion batteries, which particles can be produced by calcination in a short time, and have a narrow particle size distribution and a uniform small particle size.

9 Claims, 6 Drawing Sheets

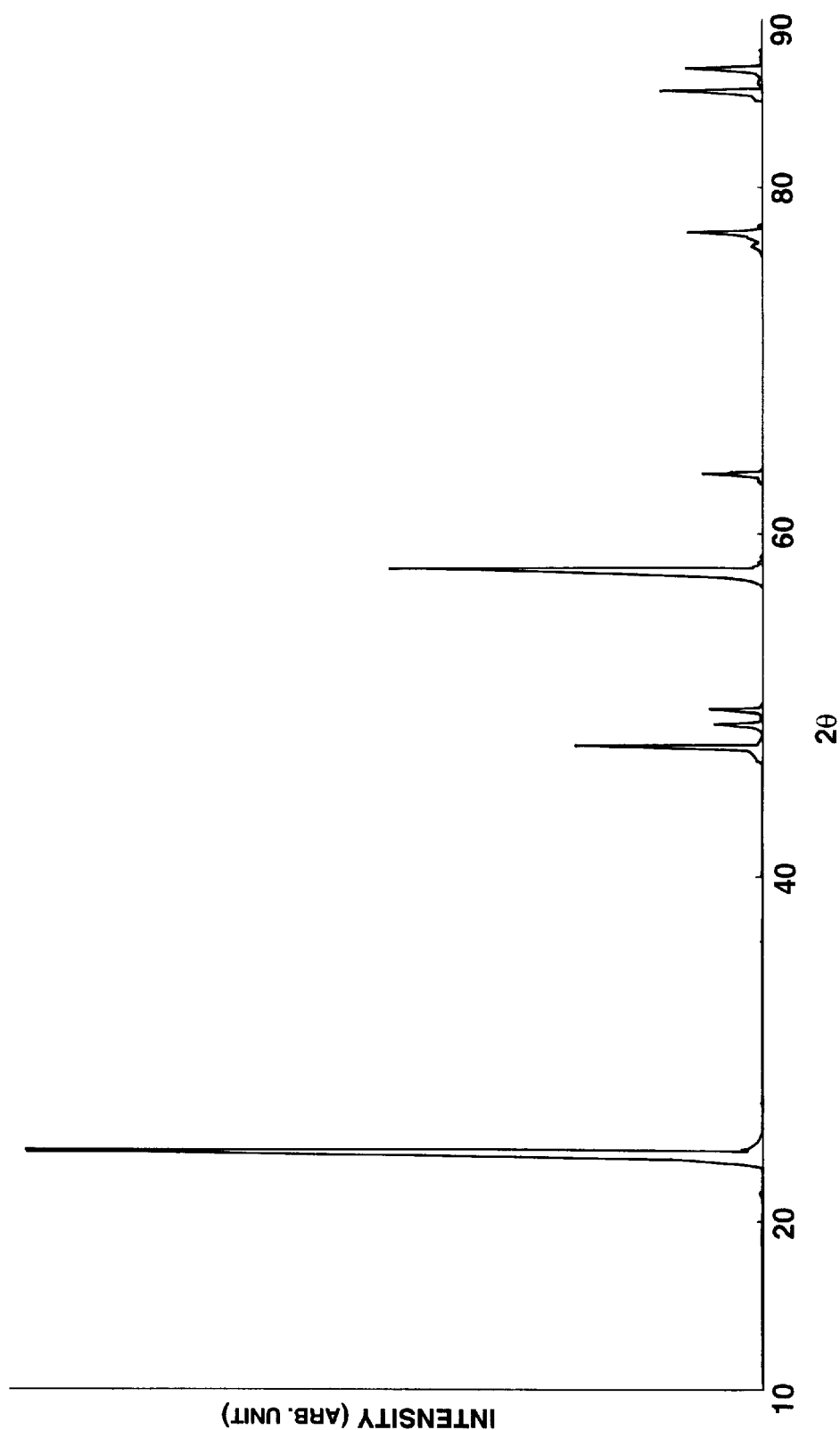

PROCESS FOR PRODUCING LITHIUM-COBALT OXIDE

BACKGROUND OF THE INVENTION

The present invention relates to a process for producing lithium-cobalt oxide represented by the formula: $Li_xCoO_2$ (0<x<1), and more particularly, to a process for producing lithium-cobalt oxide particles represented by the formula: $Li_xCoO_2$ (0<x<1), useful especially as a cathode active substance for lithium ion batteries, which can be produced by calcination in a short time, and has a narrow particle size distribution and a uniform small particle size.

In recent years, in association with developments of personal computers and portable equipment such as portable telephones, there have been an increasing demand for batteries as a power source therefor. Especially, a lot of earnest studies for lithium ion batteries have been made in various fields, because lithium is expected to provide batteries having a high electromotive force and a high energy density due to a small atomic weight and a high ionization energy thereof.

In addition, as a cathode active substance usable in lithium ion batteries, lithium-cobalt oxide ($LiCoO_2$), lithium-nickel oxide ($LiNiO_2$) or the like have been earnestly studied because these substances can generate a voltage as high as 4 V. These compounds such as lithium-cobalt oxide or lithium-nickel oxide have been conventionally produced by mixing cobalt- or nickel-containing oxides as a raw material with a lithium compound and calcining the obtained mixture at a temperature as high as not less than 500° C. (U.S. Pat. No. 4,302,518).

However, in the case of such high-temperature calcination method, it is necessary to calcine the obtained mixture for a long period of time, because the cobalt oxide particles have a low reactivity upon solid phase reaction thereof. When the mixture are calcined at such a high temperature for a long period of time, lithium contained in the lithium compound is evaporated. For this reason, the loss of lithium is caused and the composition of the obtained lithium-cobalt oxide tends to be fluctuated, resulting in such a disadvantage that it is difficult to produce lithium-cobalt oxide having a stable quality.

In addition, when the lithium-cobalt oxide particles or the lithium-nickel oxide particles are used as a cathode active substance for lithium ion batteries, these particles are first dispersed in a binder to prepare a coating material, and then the coating material is applied onto a metal plate such as copper and dried to form a cathode active substance for the lithium ion batteries. However, since the particles are calcined at a high temperature for a long period of time, the resultant lithium-cobalt oxide particles are firmly fused together. Because of the production of the coating material for cathode, such fused lithium-cobalt oxide particles must be intensely pulverized into an appropriate particle size. This causes the increase in cost of energy required. Also, there arises a problem that a grinding body used for the pulverization is abraded and disadvantageously mixed in the obtained lithium-cobalt particles.

Further, when used as a cathode active substance, since the lithium-cobalt oxide particles are dispersed in a binder and the resultant coating material is applied onto a metal plate such as a copper plate and dried to form a cathode for the lithium ion batteries, it is important that the lithium-cobalt oxide particles have a uniform particle shape and a uniform particle size, because the higher the packing density of particles in the coating layer, the higher the capacity of battery obtained becomes.

Under these circumstances, a process for the production of lithium-cobalt oxide as a cathode active substance for the lithium ion batteries, which have a narrow particle size distribution and a uniform particle size, which process comprises calcining raw particles in a short time, has been demanded.

As a result of the present inventors' earnest studies, it has been found that by mixing specific cobalt oxide with a specific lithium compound and calcining the obtained mixture at a specific temperature, the obtained lithium-cobalt oxide particles have a narrow particle size distribution and a uniform particle size. The present invention has been attained on the basis of this finding.

SUMMARY OF THE INVENTION

It is an object of the present invention to provide a process for producing lithium-cobalt oxide particles having a narrow particle size distribution and a uniform particle size, which is useful as a cathode active substance for lithium ion batteries, which process comprises calcining raw particles at a relatively low temperature and in a short time, and.

It is another object of the present invention to provide a process for producing lithium-cobalt oxide useful as a cathode active substance for lithium ion batteries having a high electromotive force and a high energy density, which can be produced by short-time calcination of raw material.

It is a further object of the present invention to provide a process for producing cobalt oxide as a raw material for lithium-cobalt oxide, which can exhibit a high reactivity with other metal compounds and can readily produce the lithium-cobalt oxide when calcined at a low temperature in a short time.

To accomplish the aims, in a first aspect of the present invention, there is provided a process for producing lithium-cobalt oxide, comprising:

mixing cobalt oxide having a BET specific surface area of 30 to 200 $m^2/g$ or an average particle size of not more than 0.1 μm, with a lithium compound; and calcining the obtained mixture at a temperature of 500 to 850° C.

In a second aspect of the present invention, there is provided a process for producing lithium-cobalt oxide, comprising:

mixing cobalt oxide having a BET specific surface area of 30 to 200 $m^2/g$ or an average particle size of not more than 0.1 μm, with a lithium compound;

adding water to the obtained mixture of the cobalt oxide and the lithium compound in an amount of 1 to 30% by weight based on the weight of the mixture;

compression-molding the water-added mixture to form a molded product having a molding density of 1.5 g/cc; and calcining the molded product at a temperature of 600 to 850° C.

In a third aspect of the present invention, there is provided a process for producing lithium-cobalt oxide, comprising:

calcining cobalt oxide hydroxide particles at a temperature of 300 to 500° C.;

mixing the obtained cobalt oxide having a BET specific surface area of 30 to 200 $m^2/g$ with a lithium compound; and calcining the obtained mixture at a temperature of 500 to 850° C.

In a fourth aspect of the present invention, there is provided a process for producing lithium-cobalt oxide, comprising:

calcining cobalt oxide hydroxide particles at a temperature of 300 to 500° C.;

mixing the obtained cobalt oxide having a BET specific surface area of 30 to 200 m²/g with a lithium compound;

adding water to the obtained mixture of the cobalt oxide and the lithium compound in an amount of 1 to 30% by weight based on the weight of the mixture;

compression-molding the water-added mixture to form a molded product having a molding density of 1.5 g/cc; and calcining the molded product at a temperature of 600 to 850° C.

In a fifth aspect of the present invention, there is provided a process for producing lithium-cobalt oxide, comprising:

neutralizing an aqueous cobalt salt solution with an aqueous alkaline solution containing an excess amount of alkali to form a suspension containing cobalt hydroxide and having a concentration ratio of alkali to cobalt (R=[OH⁻]/2[Co²⁺]) of 1.0 to 1.2 and an alkali concentration of not more than 1.0 M;

passing an oxygen-containing gas therethrough to oxidize cobalt ions therein, while heating the suspension at a temperature of not less than 60° C.;

mixing the obtained cobalt oxide having an average particle size of not more than 0.1 μm, with a lithium compound; and calcining the obtained mixture at a temperature of 500 to 850° C.

In a sixth aspect of the present invention, there is provided a process for producing lithium-cobalt oxide, comprising:

neutralizing an aqueous cobalt salt solution with an aqueous alkaline solution containing an excess amount of alkali to form a suspension containing cobalt hydroxide and having a concentration ratio of alkali to cobalt (R=[OH⁻]/2[Co²⁺]) of 1.0 to 1.2 and an alkali concentration of not more than 1.0 M;

passing an oxygen-containing gas therethrough to oxidize cobalt ions therein, while heating the suspension at a temperature of not less than 60° C.;

mixing the obtained cobalt oxide having an average particle size of not more than 0.1 μm with a lithium compound;

adding water to the obtained mixture of the cobalt oxide and the lithium compound in an amount of 1 to 30% by weight based on the weight of said mixture;

compression-molding the water-added mixture to form a molded product having a molding density of 1.5 g/cc; and calcining the molded product at a temperature of 600 to 850° C.

In a seventh aspect of the present invention, there is provided a process for producing cobalt oxide having an average particle size of not more than 0.1 μm, comprising:

neutralizing an aqueous cobalt salt solution with an aqueous alkaline solution containing an excess amount of alkali to form a suspension containing cobalt hydroxide and having a concentration ratio of alkali to cobalt (R=[OH⁻]/2[Co²⁺]) of 1.0 to 1.2 and an alkali concentration of not more than 1.0 M, and then passing an oxygen-containing gas therethrough to oxidize cobalt ions therein, while heating the suspension at a temperature of not less than 60° C.

BRIEF DESCRIPTION OF THE DRAWINGS

FIG. 6 is a graph showing an X-ray diffraction pattern of lithium-cobalt oxide particles obtained in Example 17.

DETAILED DESCRIPTION OF THE INVENTION

Figure 1:
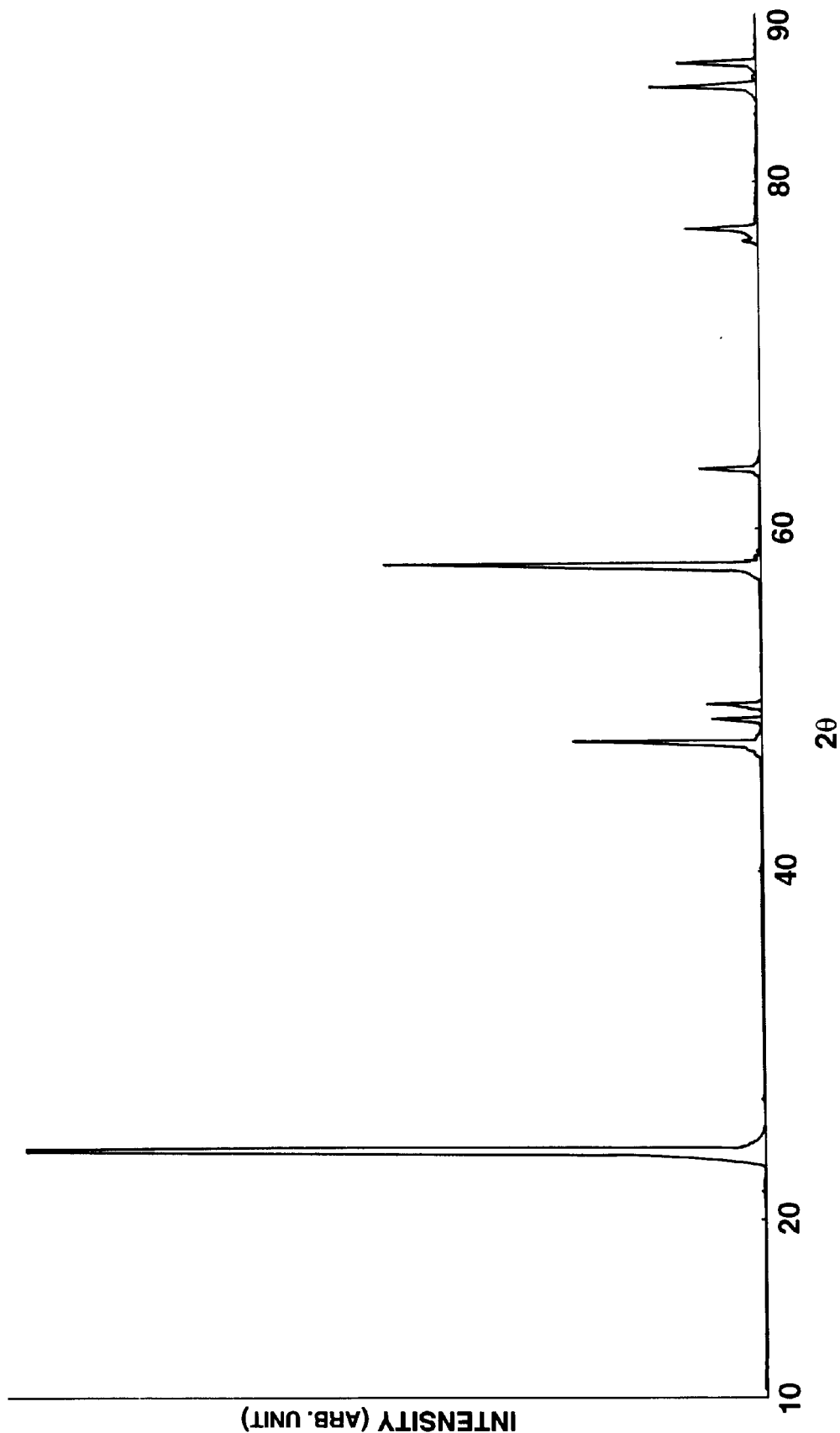
FIG. 1 is a graph showing an X-ray diffraction pattern of lithium-cobalt oxide particles obtained in Example 1.

The present invention is described in detail below.

As the cobalt oxide particles used as a raw material in the present invention, there may be exemplified:

(1) Fine crystal particles of cobalt oxide having a BET specific surface area of 30 to 200 m²/g, preferably 30 to 150 m²/g, more preferably 50 to 100 m²/g; or (2) Fine crystal particles of cobalt oxide having an average particle size of not more than 0.1 μm, preferably not more than 0.08 μm, more preferably 0.01 to 0.05 μm.

When the BET specific surface area of the cobalt oxide particles is less than 30 m²/g, the reactivity of the cobalt oxide particles with lithium becomes low, so that the cobalt oxide particles remain unreacted and are disadvantageously mixed with lithium-cobalt oxide particles as a product, and it fails to obtain the aimed lithium-cobalt oxide having a uniform particle size. On the other hand, when the BET specific surface area of the cobalt oxide particles is more than 200 m²/g, the cobalt oxide particles are deteriorated in handling property or workability.

When the average particle size of the cobalt oxide particles is more than 0.1 μm, the reactivity of the cobalt oxide particles with lithium becomes low, so that the cobalt oxide particles remain unreacted and are disadvantageously mixed with lithium-cobalt oxide particles as a product, and it fails to obtain the aimed lithium-cobalt oxide having a uniform particle size.

Incidentally, in the present invention, the BET specific surface area is a value measured by a nitrogen absorption method, and the average particle size is represented by a value measured by using a scanning electron microscope.

As the lithium compounds used in the present invention, there may be exemplified lithium carbonate, lithium oxide, lithium hydroxide, lithium hydroxide hydrate or the like. These lithium compounds can be used singly or in the form of a mixture of any two or more thereof.

In the present invention, the mixing ratio of the lithium compound to the cobalt oxide is usually 0.98:1 to 1.05:1, preferably about 1.00:1 to 1.04:1, more preferably 1.00:1 to 1.03:1 (calculated as a molar ratio of lithium to cobalt). When lithium is used in a too short amount and cobalt is used in a too excess amount, unreacted cobalt oxide which cannot act as a cathode active substance, remains in the reaction system in addition to lithium-cobalt oxide as an aimed product. It is difficult to remove the residual cobalt oxide from the lithium-cobalt oxide. In consequence, when such lithium-cobalt oxide particles containing the residual cobalt oxide are used to form a cathode, there arises difficulty in obtaining a good battery activity, i.e., a good electrochemical activity in an electrolytic solution having a lithium-ion conductivity.

On the other hand, when lithium is used in a too excess amount and cobalt is used in a too short amount, a substance which cannot act as a cathode active substance, e.g., lithium carbonate, remains in the reaction system in addition to the lithium-cobalt oxide as the aimed product. It is also difficult to remove such lithium carbonate from the lithium-cobalt oxide. In consequence, when the lithium-cobalt oxide particles containing the residual lithium carbonate is used to form a cathode, there also arises difficulty in obtaining a good battery activity, i.e., a good electrochemical activity in an electrolytic solution having a lithium-ion conductivity.

In the process according to the present invention, the mixture of the cobalt oxide and the lithium compound is heated at a temperature of 500 to 850° C., preferably 650 to 800° C. The heating time of the mixture may be usually 2 to 10 hours, preferably 5 to 10 hours. When the heating temperature is less than 500° C., lithium-cobalt oxide having a good electrochemical activity cannot be obtained. On the other hand, when the heating temperature is more than 850° C., vigorous evaporation of lithium is caused and the molar ratio of lithium to cobalt is considerably deviated from the above-mentioned range, resulting in deteriorated electrochemical activity of the lithium-cobalt oxide produced.

In addition, when the heating time is less than 2 hours, the reaction between lithium and cobalt cannot be sufficiently conducted, so that it becomes difficult to obtain a uniform product. On the other hand, even though the heating time is more than 10 hours, substantially no further improvement or effect can be recognized. Consequently, such a long heating time exceeding 10 hours is meaningless from economical and industrial viewpoints.

It is preferred that the mixture of the cobalt oxide and the lithium compound is pre-treated in the following manner before being subjected to the calcination treatment.

That is, water may be added to the mixture of the cobalt and the lithium compound in an amount of usually 1 to 30% by weight, preferably 10 to 25% by weight based on the weight of the mixture. The water-added mixture is compression-molded by using an extruder, a roller compactor, a disk-pelleter or the like to produce a molded product having a molding density of usually not less than 1.5 g/cc, preferably 2 to 5 g/cc. The thus-obtained molded product is subjected to the calcination treatment.

When the amount of water added is less than 1% by weight based on the weight of the mixture, the molded product may not have a sufficient mechanical strength, resulting in deteriorated handling property thereof. In addition, in such a case, the molded product has an uneven compression density, so that after the molded product is subjected to the calcination treatment, the lithium-cobalt oxide particles produced shows a wide particle size distribution. On the other hand, when the amount of water added is more than 30% by weight, the water-soluble lithium compound may be caused to flow out of the molded product, so that the composition of the lithium-cobalt oxide produced is considerably varied, thereby failing to obtain lithium-cobalt oxide having a stable quality.

In the case where the molded product having a molding density of less than 1.5 g/cc is calcined, the grain growth of lithium-cobalt oxide particles may become insufficient. Therefore, when a coating film is formed by using such lithium-cobalt oxide particles, the packing density of the lithium-cobalt oxide in the coating film may become unsatisfactory. The upper limit of the molding density of the molded product is not particularly restricted, but is preferably set to about 5 g/cc, more preferably about 3 g/cc, since it becomes difficult to produce a molded product when the molding density is too high.

The cobalt oxide fine crystal particles used as a raw material in the present invention can be produced by the following methods.

(1) The calcination of cobalt oxide hydroxide particles are conducted in an oxygen-containing gas, e.g., in air at a temperature of usually 300 to 500° C., preferably 300 to 400° C. to obtain cobalt oxide fine crystal particles having a BET specific surface area of 30 to 200 m²/g.

When the calcining temperature is less than 300° C., a part of the cobalt oxide hydroxide particles may remain undecomposed and may exist together with the cobalt oxide produced, thereby failing to obtain aimed uniform cobalt oxide fine crystal particles having a high reactivity. On the other hand, when the calcining temperature is more than 500° C., there are produced cobalt oxide particles having a BET specific surface area of less than 30 m²/g, i.e., a large particle size, thereby also failing to obtain aimed cobalt oxide fine crystal particles having a high reactivity. The calcining time is not particularly restricted, but preferably lies within the range of from 15 minutes to 2 hours, preferably 15 to 30 minutes in order to achieve a uniform temperature distribution in the reaction system.

(2) An aqueous solution of cobalt salt is neutralized by an aqueous alkaline solution containing an excess amount of alkali relative to the cobalt salt to obtain a suspension of cobalt (II) hydroxide. In the cobalt (II) hydroxide-containing suspension, the concentration ratio of alkali to cobalt (R= [OH⁻]/2[Co²⁺]) is usually 1.0 to 1.2, and the concentration of the excessive alkali is usually not more than 1.0 M. Next, the obtained suspension is heated to a temperature of usually not less than 60° C., preferably 70 to 100° C. The oxygen-containing gas, e.g., air is blown into the suspension to oxidize cobalt ions therein, thereby causing cobalt oxide fine particles to be precipitated.

As the cobalt salts used in the present invention, there may be exemplified cobalt sulfate, cobalt chloride, cobalt nitride or the like. These cobalt salts can be used singly or in the form of a mixture of any two or more thereof. In addition, as the aqueous alkaline solution used in the present invention, there may be exemplified aqueous solutions of sodium hydroxide, potassium hydroxide, sodium carbonate, potassium carbonate or the like. These aqueous alkaline solutions can be used singly or in the form of a mixture of any two or more thereof. The concentration ratio (R) of alkali to cobalt in the suspension of cobalt (II) hydroxide used in the present invention is expressed by the formula: "[OH⁻]/2[Co²⁺]", and is usually 1.0 to 1.2, preferably 1.01 to 1.10. The concentration of the excessive alkali in the suspension is usually not more than 1.0 M, preferably not more than 0.5 M.

When the concentration ratio (R) of alkali to cobalt or the concentration of the excessive alkali in the suspension is out of the above-mentioned range, single-phase cobalt oxide particles may not be obtained, i.e., the obtained product is in the form of a mixture containing different kinds of particles.

In the present invention, the heating temperature of the suspension containing the cobalt (II) hydroxide is not less than 60° C. When the heating temperature of the suspension is less than 60° C., single-phase cobalt oxide particles may not be obtained, i.e., the obtained product is in the form of a mixture containing different kinds of particles. The upper limit of the heating temperature of the suspension is not particularly restricted, but is preferably about 95° C. When the heating temperature exceeds 100° C., the use of a high-pressure vessel is required, thereby not only increasing the cost of equipment therefor but also resulting in complicated, uneconomical and unpractical process.

Further, in the present invention, as the method of oxidizing the cobalt hydroxide in the suspension, there can be used a method of blowing an oxygen-containing gas, e.g., air into the suspension. In the case where oxidants other than the oxygen-containing gas, for example, hydrogen peroxide or the like are used, it is difficult to obtain single-phase cobalt oxide fine particles.

The end point of the precipitation reaction for the production of cobalt oxide fine particles can be determined by immersing an ORP electrode in the suspension and measuring a potential of the electrode to continuously monitor progress of the precipitation reaction. After the end point of the precipitation reaction is reached, the suspension is filtered to separate a solid component therefrom, followed by drying the solid component.

In accordance with the present invention, (a) the cobalt oxide fine crystal particles having a BET specific surface area of 30 to 200 $m^2/g$ (such particles can be produced by calcining raw particles, for example, cobalt oxide hydroxide particles in air at a temperature of 300 to 500° C.), or (b) the cobalt oxide particles having an average particle size of not more than 0.1 μm, are used as a cobalt raw material and mixed with the lithium compound. Water is added to the obtained mixture in an amount of 1 to 30% by weight based on the weight of the mixture. The water-added mixture is then compression-molded by using an extrude, a roller compactor or a disk-pelleter to obtain a molded product having a molding density of not less than 1.5 g/cc. Thereafter, by calcining the obtained molded product in an oxygen-containing gas such as air, the reaction between the cobalt oxide and the lithium compound can be completed in a short time, thereby obtaining aimed lithium-cobalt oxide particles having a narrow particle size distribution and a uniform particle size.

In general, it is considered that a solid phase reaction upon the calcination proceeds by mutual diffusion of the mixed raw particles, which is caused at contact points therebetween. It is considered that when the lithium compound and the cobalt oxide are calcined, lithium is more readily diffused as compared to cobalt since the melting point of lithium is considerably lower than that of the cobalt oxide, so that the reaction therebetween can be caused to proceed mainly by the diffusion of lithium into cobalt oxide particles. On the basis of the above discussion, it is considered that by finely pulverizing the cobalt oxide particles rather than the lithium compound particles, the distance of diffusion of lithium which is required to complete the reaction, can be reduced, so that the reaction between cobalt and lithium can be completed in a short time. For this reason, it is further considered that when the cobalt oxide particles which are uniform in particle size, i.e., have a BET specific surface area of 30 to 200 $m^2/g$ or an average particle size of not more than 0.1 μm, are used as a cobalt raw material, the reaction between cobalt and lithium can proceed rapidly upon the calcination (namely, the reactivity of the cobalt raw material can be enhanced), thereby enabling the reaction to be completed in a short time.

It is still further considered that by using the particles having a uniform small particle size and a high reactivity as raw materials, adding 1 to 30% by weight of water to the raw particles, compression-molding the water-added mixture into a molded product having a molding density of 1.5 g/cc, and subjecting the molded product to the calcination treatment, it becomes possible to produce lithium-cobalt oxide particles having a narrow particle size distribution and a uniform particle size. In the case where dry particles containing no water are compression-molded, the sliding motion therebetween is prevented, so that there is caused difficulty in uniformly transmitting the compression force over a whole part of the system. This results in uneven packing density of the molded product to be calcined. On the other hand, in accordance with the present invention, it is considered that by incorporating a small amount of water into the system, the sliding motion between the particles can be facilitated, so that the compression force can be uniformly transmitted over a whole part of the system, resulting in producing a uniform molded product and then obtaining lithium-cobalt oxide particles having a narrow particle size distribution and a uniform particle size.

In the production of the cobalt oxide particles used as the cobalt raw material in the present invention, the aqueous cobalt salt solution is mixed with the aqueous alkaline solution containing an excessive amount of alkali which amount is higher than that capable of neutralizing the cobalt salt, to obtain a suspension containing cobalt (II) hydroxide, and then air is passed through the suspension while heating to oxidize cobalt ions therein and precipitate the oxidized product, so that it is possible to obtain cobalt oxide fine particles having an average particle size of not more than 0.1 μm and a narrow particle size distribution. The reason why such cobalt oxide fine particles having a narrow particle size distribution can be obtained, is considered such that since the cobalt oxide is precipitated from cobalt hydroxide uniformly dispersed in the aqueous solution, uniform nuclei are produced and simultaneously the particles are prevented from being fused together.

The reason why single-phase cobalt oxide crystal particles cannot be obtained when oxidants other than an oxygen-containing gas such as air, are used, is considered such that while air has an oxidation property suitable for the production of single-phase cobalt oxide particles, these oxidants have different oxidation properties unsuitable therefor.

In the process according to the present invention, it is possible to provide lithium-cobalt oxide particles having a uniform particle size by calcining raw materials in a short time. Further, the lithium-cobalt oxide produced by the process according to the present invention can used as a cathode active substance for lithium ion batteries, and is suitably used as a cathode active substance for lithium ion batteries having a high electromotive force and a high energy density.

EXAMPLES

The present invention will now be described in more detail with reference to the following examples, but the present invention is not restricted to those examples and various modifications are possible within the scope of the invention.

Incidentally, the identification of reaction product particles and the analysis of the crystal structure thereof were conducted by an X-ray diffraction method using an X-ray diffractometer (manufactured by RIGAKU DENKI CO., LTD.; X-ray used: Mn-filtered Fe-Kα ray; voltage: 40 kV; and current: 20 mA). Further, the configuration or shape of particles and particle size distribution thereof were observed and measured by using a transmission electron microscope and a scanning electron microscope.

Example 1
<Production of lithium-cobalt oxide>

19.96 g of cobalt oxide particles as a cobalt raw material having an average particle size of 0.05 μm and 9.28 g of lithium carbonate were mechanically mixed together in a mortar at a mixing ratio of 1.01:1 (calculated as a molar ratio of lithium to cobalt). The obtained mixture was heated to 800° C. and reacted with each other for 6 hours at that temperature. The obtained particles were again pulverized in a mortar to obtain black colored particles. As a result of X-ray diffraction analysis, the obtained black colored particles were identified to be layered rock salt-type lithium-cobalt oxide as shown in FIG. 1.

<Evaluation of electrochemical properties>

Next, the electrochemical properties of the thus obtained lithium-cobalt oxide when used as an electrode active substance were evaluated by a potential sweep method.

First, the obtained lithium-cobalt oxide particles were mixed with 10% by weight of polyethylene tetrafluoride as a binder and 10% by weight of carbon black as a conducting agent. 0.5 g of the obtained mixture was weighed and filled into a nickel mesh as a current collector to form a working electrode as a cathode to be tested. In addition, metal lithium foils were filled into a stainless steel mesh to form an anode. An electrode made of metal lithium was used as a reference electrode. As an electrolyte, there was used a solution prepared by dissolving lithium perchlorate ($LiClO_4$) in a mixed solvent containing propylene carbonate and dimethoxy ethane in a volume ratio of 1:1, such that the molar concentration of the lithium perchlorate in the solution was 1 M.

The thus-produced working electrode as cathode, anode, reference electrode and electrolyte were used to form a cell for electrochemical measurement. By using the thus-formed cell for electrochemical measurement, the charge/discharge electric characteristic curve thereof was determined under such conditions that the voltage applied was 3.0 to 4.2 V based on the reference metal lithium electrode and the current was 0.5 mA/cm$^2$. As a result, it was confirmed that the charge/discharge electric capacity of the cell as an index showing an electrochemical activity of the lithium-cobalt oxide was 135 mAh/g.

Examples 2 to 5 and Comparative Examples 1 to 2

The same procedure as defined in Example 1 was conducted except that the particle size, the heating temperature and the heating time of cobalt oxide particles used as a raw material were varied as shown in Table 1, thereby obtaining particles as reaction products. Reaction conditions used for the production of these particles and properties of the obtained reaction product particles are also shown in Table 1.

All of the particles obtained in Examples 2 to 5 were identified to be lithium-cobalt oxide having the same crystal structure as that of layered rock salt-type lithium-cobalt oxide.

On the other hand, it was confirmed that the particles obtained in Comparative Examples 1 to 2 were a mixture of layered rock salt-type lithium-cobalt oxide and cobalt oxide.

Further, the charge/discharge electric capacities of cells formed by using the obtained lithium-cobalt oxide particles were measured in the same manner as in Example 1. The results are also shown in Table 1. As recognized from Table 1, the charge/discharge electric capacities of cells formed by using the lithium-cobalt oxide particles obtained in Examples 2 to 5 were larger than those of Comparative Examples 1 and 2. Accordingly, it was confirmed that the lithium-cobalt oxide produced according to the present invention exhibited a higher electrochemical activity.

TABLE 1

|  | Raw cobalt particles | Average particle size (μm) | Heating temperature (° C.) |
|---|---|---|---|
| Example 2 | $Co_3O_4$ | 0.05 | 800 |
| Example 3 | $Co_3O_4$ | 0.04 | 750 |
| Example 4 | $Co_3O_4$ | 0.04 | 700 |
| Example 5 | $Co_3O_4$ | 0.08 | 850 |
| Comparative Example 1 | $Co_3O_4$ | 0.5 | 750 |
| Comparative Example 2 | $Co_3O_4$ | 1.0 | 800 |

|  | Heating time (hr.) | Reaction product | Charge/discharge electric capacity (mAh/g) |
|---|---|---|---|
| Example 2 | 4.0 | $LiCoO_2$ | 131 |
| Example 3 | 5.0 | $LiCoO_2$ | 125 |
| Example 4 | 8.0 | $LiCoO_2$ | 127 |
| Example 5 | 3.0 | $LiCoO_2$ | 135 |
| Comparative Example 1 | 10.0 | $LiCoO_2 + Co_3O_4$ | 84 |
| Comparative Example 2 | 10.0 | $LiCoO_2 + Co_3O_4$ | 76 |

Examples 6 to 8 and Comparative Examples 3 to 4

Cobalt oxide hydroxide as a raw material was calcined at various temperatures $T_1$ to produce cobalt oxide fine crystal particles. The obtained cobalt oxide fine crystal particles and lithium carbonate particles were mechanically mixed together in a mortar at a mixing ratio of 1.01:1 (calculated as a molar ratio of lithium to cobalt). The obtained mixture was reacted with each other at various temperatures $T_2$ for various reaction times as shown in Table 2 to obtain reaction products. The obtained reaction product particles were again pulverized in a mortar to obtain black colored particles. The properties of the obtained black colored particles were evaluated in the sane manner as in Example 1. Reaction conditions used for the production of these particles and properties of the obtained particles are also shown in Table 2. All of the particles obtained in Examples 6 to 8 were identified to be lithium-cobalt oxide having the same crystal structure as that of layered rock salt-type lithium-cobalt oxide. On the other hand, it was confirmed that the particles obtained in Comparative Examples 3 to 4 were a mixture of layered rock salt-type lithium-cobalt oxide and cobalt oxide.

Further, the charge/discharge electric capacities of the obtained lithium-cobalt oxide particles were measured in the same manner as in Example 1. The results are also shown in Table 2. As recognized from Table 2, the charge/discharge electric capacities of cells formed by using the lithium-cobalt oxide particles obtained in Examples 6 to 8 were larger than those obtained in Comparative Examples 3 and 4. Accordingly, it was confirmed that the lithium-cobalt oxide produced according to the present invention exhibited a higher electrochemical activity.

TABLE 2

|  | Raw cobalt particles | Heating temperature $T_1$ (° C.) | Specific surface area (m$^2$/g) | Heating temperature $T_2$ (° C.) |
|---|---|---|---|---|
| Example 6 | CoO(OH) | 300 | 120 | 750 |
| Example 7 | CoO(OH) | 400 | 35 | 800 |
| Example 8 | CoO(OH) | 350 | 75 | 700 |
| Comparative Example 3 | CoO(OH) | 600 | 20 | 800 |
| Comparative Example 4 | CoO(OH) | None | — | 750 |

|  | Heating time (hr.) | Reaction product | Charge/discharge electric capacity (mAh/g) |
|---|---|---|---|
| Example 6 | 5.0 | $LiCoO_2$ | 130 |
| Example 7 | 8.0 | $LiCoO_2$ | 134 |

TABLE 2-continued

| Example 8 | 8.0 | LiCoO$_2$ | 119 |
| Comparative Example 3 | 10.0 | LiCoO$_2$ | 93 |
| Comparative Example 4 | 10.0 | LiCoO$_2$ | 73 |

Example 9

Figure 2:
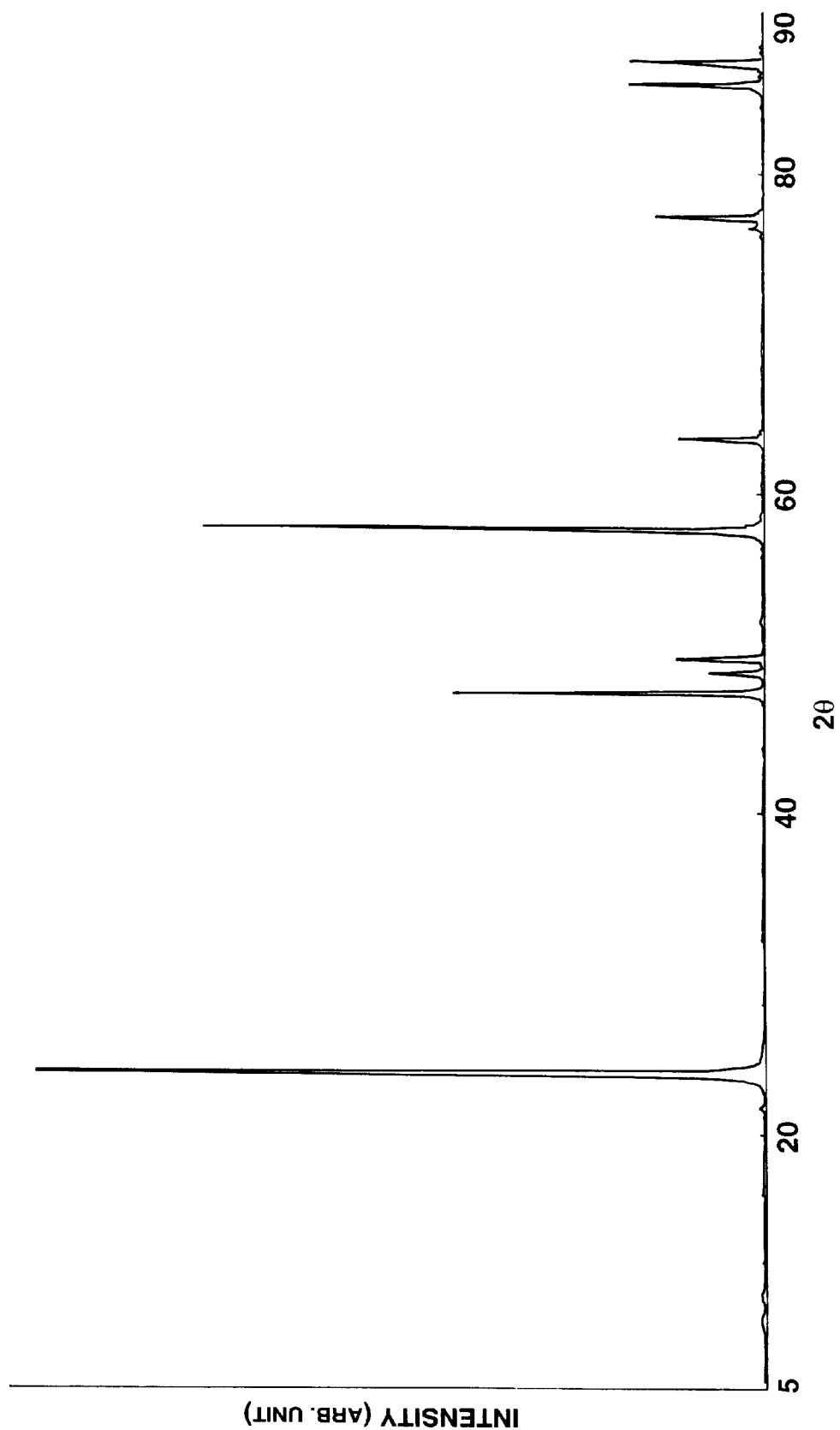
FIG. 2 is a graph showing an X-ray diffraction pattern of lithium-cobalt oxide particles obtained in Example 9.
Figure 3:
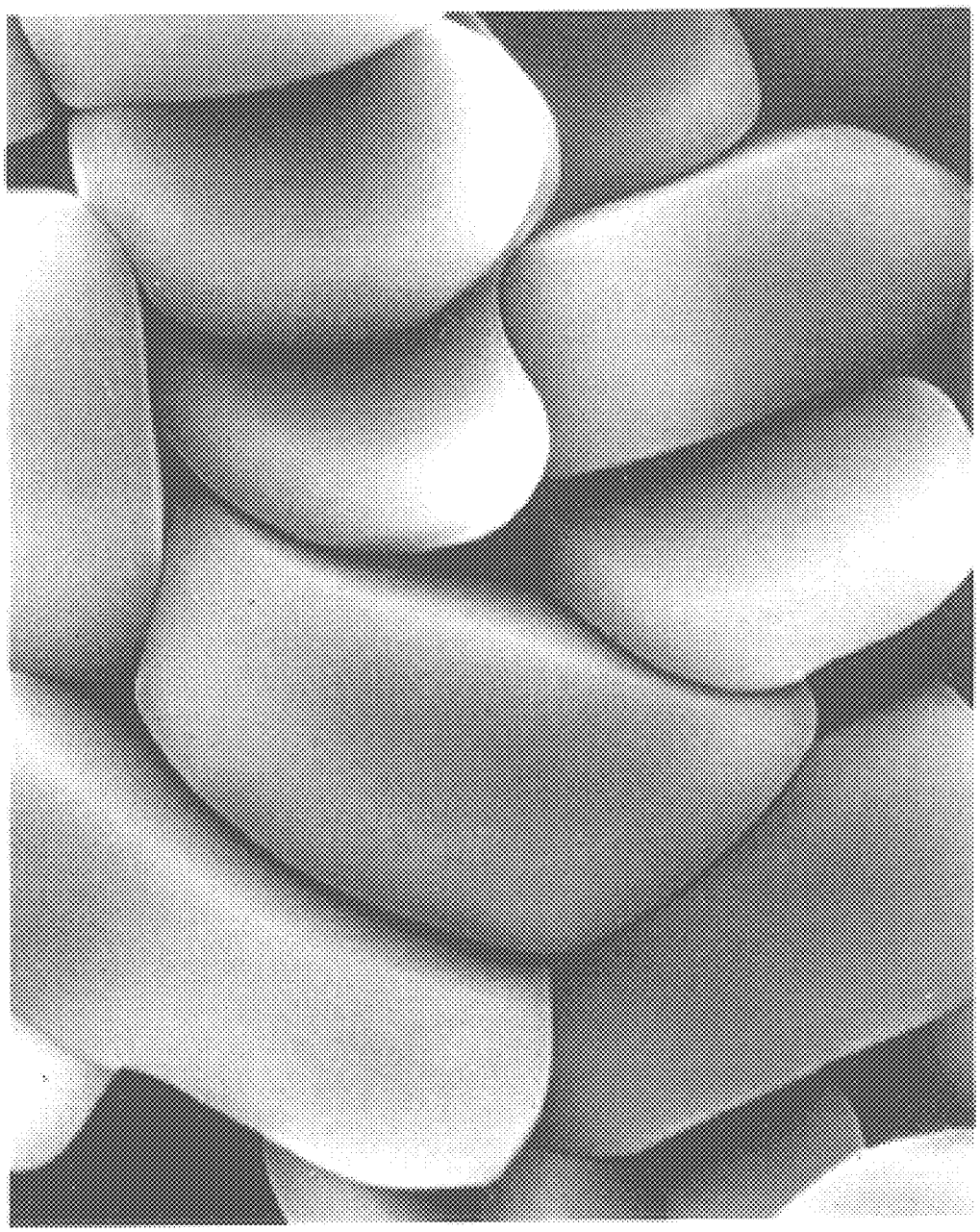
FIG. 3 is a scanning electron microscope photograph (×8,000) showing a particle structure of lithium-cobalt oxide particles obtained in Example 9.

199.6 g of cobalt oxide particles as a cobalt raw material having an average particle size of 0.05 μm and 92.8 g of lithium carbonate were mechanically mixed together at a mixing ratio of 1.01:1 (calculated as a molar ratio of lithium to cobalt). The obtained mixture was sprayed with 5% by weight of water based on the weight of the mixture. The resultant mixture was compression-molded by a roller compactor to obtain a molded product having a molding density of 2.3 g/cc. The molded product was placed within an electric furnace, heated to 800° C. and calcined for 6 hours at that temperature. The obtained calcined product was pulverized in a mortar to obtain black colored particles. As a result of X-ray diffraction analysis, the obtained black colored particles were identified to be layered rock salt-type lithium-cobalt oxide particles having an average particle size of 3.5 μm, as shown in FIG. 2. Further, it was confirmed that the lithium-cobalt oxide particles had a uniform particle size, as shown in a scanning electron microphotograph (×8,000) of FIG. 3.

The same procedure as defined in Example 1 was conducted to form a working electrode as cathode, anode, reference electrode and electrolyte.

The thus-produced working electrode as cathode, anode, reference electrode and electrolyte were used to form a cell for electrochemical measurement. By using the thus-formed cell for electrochemical measurement, the charge/discharge characteristic curve thereof was determined under such conditions that the voltage applied was 3.0 to 4.2 V based on the reference metal lithium electrode and the current was 0.5 mA/cm$^2$. As a result, it was confirmed that the charge/discharge electric capacity of the cell as an index showing an electrochemical activity of the lithium-cobalt oxide was 137 mAh/g.

Examples 10 to 13 and Comparative Examples 5 to 8

The same procedure as defined in Example 9 was conducted except that the particle size, the water content, the molding density, the calcination temperature and the calcination time were varied as shown in Table 3, thereby obtaining particles as reaction products. The reaction conditions used for the production of these particles and properties of the obtained particles are also shown in Table 3. All of the particles obtained in Examples 10 to 13 were identified to be lithium-cobalt oxide having the same crystal structure as that of layered rock salt-type lithium-cobalt oxide.

On the other hand, it was confirmed that the particles obtained in Comparative Examples 5 to 6 were a mixture of layered rock salt-type lithium-cobalt oxide and cobalt oxide. Whereas, the particles obtained Comparative Examples 7 and 8 showed a non-uniform particle size distribution though these particles had the same crystal structure as that of layered rock salt-type lithium-cobalt oxide.

The charge/discharge electric capacities of the obtained particles were measured in the same manner as in Example 9. The results are also shown in Table 3. As recognized from Table 3, the charge/discharge electric capacities of cells formed by using the lithium-cobalt oxide particles obtained in Examples 10 to 13 were larger than those of Comparative Examples 5 and 8. Accordingly, it was confirmed that the lithium-cobalt oxide produced according to the present invention exhibited a high electrochemical activity.

TABLE 3

| | Average particle size of cobalt oxide (μm) | Water content/ molding density (wt. %)/(g/cc) | Calcining temperature/ calcining time (° C.)/(hr.) |
|---|---|---|---|
| Example 9 | 0.05 | 5.0/2.3 | 800/6.0 |
| Example 10 | 0.05 | 8.0/2.5 | 850/4.0 |
| Example 11 | 0.04 | 3.5/2.2 | 750/5.0 |
| Example 12 | 0.04 | 2.0/2.2 | 800/8.0 |
| Example 13 | 0.08 | 5.0/2.5 | 850/5.0 |
| Comparative Example 5 | 0.50 | 0.5/2.2 | 750/10.0 |
| Comparative Example 6 | 1.0 | 0.2/2.3 | 800/10.0 |
| Comparative Example 7 | 0.05 | 0.5/2.2 | 850/4.0 |
| Comparative Example 8 | 0.05 | 0.5/0.9 | 850/4.0 |

| | Reaction product | An average particle size distribution (μm)/(μm) | Charge/discharge electric capacity (mAh/g) |
|---|---|---|---|
| Example 9 | LiCoO$_2$ | 3.5 ± 0.6 | 137 |
| Example 10 | LiCoC2 | 7.0 ± 1.0 | 136 |
| Example 11 | LiCoO$_2$ | 1.5 ± 0.4 | 125 |
| Example 12 | LiCoO$_2$ | 3.0 ± 0.6 | 133 |
| Example 13 | LiCoO$_2$ | 6.0 ± 0.8 | 137 |
| Comparative Example 5 | LiCoO$_2$ + Co$_3$O$_4$ | Two-peak distribution | 84 |
| Comparative Example 6 | LiCoO$_2$ + Co$_3$O$_4$ | Two-peak distribution | 76 |
| Comparative Example 7 | LiCoO$_2$ | 5.0 ± 0.3 | 118 |
| Comparative Example 8 | LiCoO$_2$ | 0.8 ± 0.4 | 106 |

Examples 14 to 16 and Comparative Examples 9 to 12

Cobalt oxide hydroxide was calcined at various heating temperatures $T_1$ as shown in Table 4, thereby obtaining raw cobalt oxide particles which were different in BET specific surface area thereof from each other, as shown in Table 4. By using the thus obtained cobalt oxide particles, the same procedure as defined in Example 9 was conducted except that the water content, the molding density, the heating temperature and the heating time of the molded product were varied as shown in Table 4, thereby obtaining particles as reaction products. Reaction conditions used for the production of these particles and properties of the obtained particles are also shown in Table 4.

All of the particles obtained in Examples 14 to 16 were identified to be lithium-cobalt oxide having the same crystal structure as that of layered rock salt-type lithium-cobalt oxide.

On the other hand, it was confirmed that the particles obtained in Comparative Examples 9 and 10 were a mixture of layered rock salt-type lithium-cobalt oxide and cobalt oxide. Whereas, the particles obtained Comparative Examples 11 and 12 showed a non-uniform particle size distribution though these particles had the same crystal structure as that of layered rock salt-type lithium-cobalt oxide.

Further, the charge/discharge electric capacities of cells formed by using the obtained particles were measured in the same manner as in Example 9. The results are also shown in Table 4. As recognized from Table 4, the charge/discharge electric capacities of cells formed by using the lithium-cobalt oxide particles obtained in Examples 14 to 16 were larger than those of Comparative Examples 9 to 12. Accordingly, it was confirmed that the lithium-cobalt oxide produced according to the present invention exhibited a high electrochemical activity.

TABLE 4

| | Calcining temperature/ BET specific surface area (° C.)/(m$^2$/g) | Water content/ molding density (wt. %)/(g/cc) | Calcining temperature/ calcining time (° C.)/(hr.) |
|---|---|---|---|
| Example 14 | 300/120 | 5.0/2.3 | 750/5.0 |
| Example 15 | 400/35 | 3.5/2.3 | 800/8.0 |
| Example 16 | 350/75 | 8.0/2.5 | 850/5.0 |
| Comparative Example 9 | 600/20 | 0.5/2.3 | 750/10.0 |
| Comparative Example 10 | Non-calcined/70 | 1.2/2.3 | 800/10.0 |
| Comparative Example 11 | 300/120 | 0.5/2.1 | 800/8.0 |
| Comparative Example 12 | 300/120 | 0.5/0.8 | 800/8.0 |

| | Reaction product | An average particle size distribution ($\mu$m)/($\mu$m) | Charge/discharge electric capacity (mAh/g) |
|---|---|---|---|
| Example 14 | LiCoO$_2$ | 1.5 ± 0.4 | 130 |
| Example 15 | LiCoO$_2$ | 2.5 ± 0.5 | 134 |
| Example 16 | LiCoO2 | 6.5 ± 0.6 | 137 |
| Comparative Example 9 | LiCoO$_2$ + Co$_3$O$_4$ | Two-peak distribution | 73 |
| Comparative Example 10 | LiCoO$_2$ + Co$_3$O$_4$ | Two-peak distribution | 93 |
| Comparative Example 11 | LiCoO$_2$ | 2.0 ± 0.8 | 115 |
| Comparative Example 12 | LiCoO$_2$ | 0.9 ± 0.4 | 105 |

Example 17

<Production of cobalt oxide>

Figure 4:
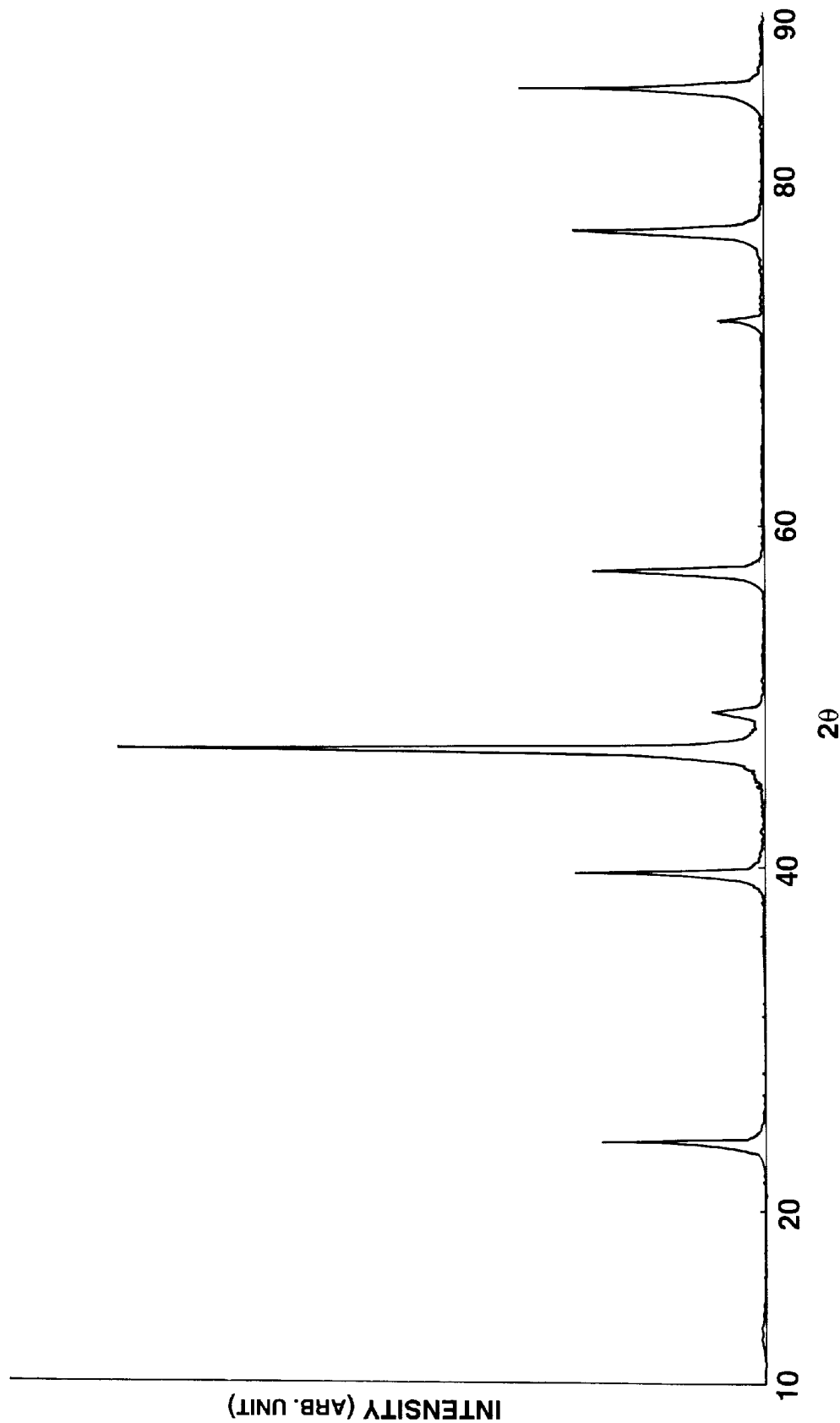
FIG. 4 is a graph showing an X-ray diffraction pattern of spinel-type cobalt oxide ($Co_3O_4$) particles obtained in Example 17.

Cobalt sulfate heptahydrate was dissolved in 2,000 ml of water to obtain an aqueous solution thereof. 2,500 ml of a 0.756M-NaOH aqueous solution was added to the aqueous cobalt sulfate solution to obtain a suspension containing cobalt (II) hydroxide. The thus obtained suspension had a concentration ratio (R=[OH$^-$]/2[Co$^{2+}$]) of 1.05, and an excess NaOH concentration of 0.02 M. The suspension was heated up to 80° C. while mechanically stirring. While keeping the temperature of the suspension constant, air was passed through the suspension to oxidize cobalt (II) hydroxide for 20 hours. The obtained precipitate was filtered out of the suspension, washed with water and dried at 60° C. to obtain black colored particles. As a result of X-ray diffraction analysis, the obtained black colored particles were identified to be cobalt oxide having a spinel-type crystal structure, as recognized from X-ray diffraction characteristic curve shown in FIG. 4. From the transmission electron microscope photograph shown in FIG. 5, it was further recognized that the cobalt oxide particles were uniform in particle size and had an average particle size of about 0.03 $\mu$m.

<Calcination of lithium-cobalt oxide>

19.96 g of the thus obtained cobalt oxide particles having an average particle size of 0.03 $\mu$m and 9.28 g of lithium carbonate particles were mechanically mixed together in a mortar at a mixing ratio of 1.01:1 (calculated as a molar ratio of lithium to cobalt). The obtained mixture was heated to 750° C. and reacted with each other for 6 hours at that temperature. The obtained particles were again pulverized in a mortar to obtain black colored particles. As a result of X-ray diffraction analysis, the obtained black colored particles were identified to be layered rock salt-type lithium-cobalt oxide particles, as shown in FIG. 6.

Examples 18 to 22 and Comparative Examples 9 to 13

Figure 5:
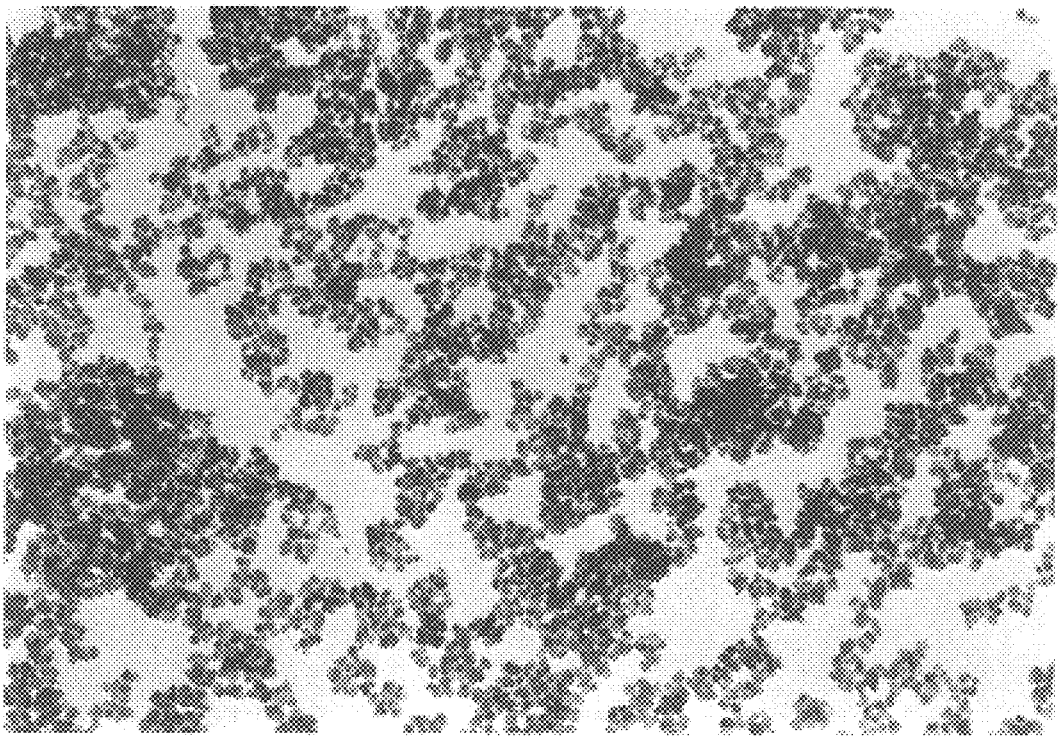
FIG. 5 is a scanning electron microscope photograph (×40,000) showing a particle structure of spinel-type cobalt oxide ($Co_3O_4$) particles obtained in Example 17.

In Examples 18 to 22 and Comparative Examples 9 to 11, the same procedure as defined in Example 17 was conducted except that the concentration ratio of alkali to cobalt (R= [OH$^-$]/2[CO$^{2+}$]), the excess alkali concentration and the heating temperature were varied as shown in FIG. 5, thereby obtaining particles as reaction products.

In Comparative Examples 12 and 13, the same procedure as defined in Example 17 was conducted except that the reaction conditions were varied as shown in Table 5, and the oxidation of cobalt hydroxide in the suspension was conducted by using oxidants such as hydrogen peroxide or nitride ions instead of passing air through the suspension, thereby obtaining particles as reaction products. The reaction conditions used for the production of these particles and properties of the obtained particles are also shown in Table 5.

As is apparent from Table 5, all of the particles obtained in Examples 18 to 22 were spinel-type cobalt oxide fine particles having a narrow particle size distribution and a uniform small particle size. On the other hand, the reaction product particles obtained in Comparative Examples 9 to 13, were mixture of granular cobalt oxide and thin plate-shaped cobalt oxide hydroxide (Comparative Examples 9 and 10), thin plate-shaped cobalt oxide hydroxide (Comparative Examples 11 and 12), or unreacted cobalt hydroxide (Comparative Example 13).

TABLE 5

| | Concentration ratio R of alkali to cobalt | Concentration of excess NaOH (M) | Heating temperature (° C.) | Reaction product | Average particle size ($\mu$m) |
|---|---|---|---|---|---|
| Example 18 | 1.05 | 0.02 | 60 | Co$_3$O$_4$ | 0.02 |
| Example 19 | 1.05 | 0.02 | 85 | Co$_3$O$_4$ | 0.04 |
| Example 20 | 1.05 | 0.02 | 90 | Co$_3$O$_4$ | 0.05 |
| Example 21 | 0.02 | 0.008 | 90 | Co$_3$O$_4$ | 0.08 |
| Example 22 | 1.15 | 0.06 | 90 | Co$_3$O$_4$ | 0.04 |
| Comparative Example 9 | 1.05 | 0.02 | 50 | Co$_3$O$_4$ + CoO(OH) | — |
| Comparative Example 10 | 2.00 | 0.4 | 80 | Co$_3$O$_4$ + CoO(OH) | — |
| Comparative Example 11 | 5.00 | 1.6 | 80 | CoO(OH) | — |
| Comparative Example 12 | 1.02 | 0.008 | 90 | CoO(OH) | — |
| Comparative Example 13 | 1.05 | 0.02 | 80 | Co(OH)$_2$ | — |

Examples 23 to 27 and Comparative Examples 14 to 18

Using the cobalt oxide particles obtained in Examples 18 to 22 and Comparative Examples 9 to 13, the reactivity between the cobalt oxide particles and the lithium compound was evaluated in the same manner as defined in Example 17. The results are shown in Table 6.

As is apparent from Table 6, it was confirmed that only when the spinel-type cobalt oxide fine particles obtained in Examples 18 to 22 and having a narrow particle size distribution and a uniform small particle size, were used, the mixture of the cobalt oxide and the lithium compound was able to be calcined at a low temperature in a short time to produce single-phase layered rock salt-type lithium-cobalt oxide.

TABLE 6

| | Cobalt oxide particles used | Molar ratio Li/Co | Calcining temperature (° C.) | Calcining time (hr.) | Reaction product |
|---|---|---|---|---|---|
| Example 23 | Particles obtained in Example 18 | 1.01 | 750 | 6.0 | $LiCoO_2$ |
| Example 24 | Particles obtained in Example 19 | 1.01 | 750 | 6.0 | $LiCoO_2$ |
| Example 25 | Particles obtained in Example 20 | 1.01 | 750 | 6.0 | $LiCoO_2$ |
| Example 26 | Particles obtained in Example 21 | 1.01 | 750 | 6.0 | $LiCoO_2$ |
| Example 27 | Particles obtained in Example 22 | 1.01 | 750 | 6.0 | $LiCoO_2$ |
| Comparative Example 14 | Particles obtained in Comparative Example 9 | 1.01 | 750 | 6.0 | $LiCoO_2$ + $Co_3O_4$ |
| Comparative Example 15 | Particles obtained in Comparative Example 10 | 1.01 | 750 | 6.0 | $LiCoO_2$ + $Co_3O_4$ |
| Comparative Example 16 | Particles obtained in Comparative Example 11 | 1.01 | 750 | 6.0 | $LiCoO_2$ + $Co_3O_4$ |
| Comparative Example 17 | Particles obtained in Comparative Example 12 | 1.01 | 750 | 6.0 | $LiCoO_2$ + $Co_3O_4$ |
| Comparative Example 18 | Particles obtained in Comparative Example 13 | 1.01 | 750 | 6.0 | $LiCoO_2$ + $Co_3O_4$ |

What is claimed is:

1. A process for producing lithium-cobalt oxide, comprising:

(1) mixing cobalt oxide having a BET specific surface area of 30 to 200 $m^2/g$ or an average particle size of not more than 0.1 $\mu m$, with a lithium compound;

(2) adding water to the obtained mixture of the cobalt oxide and the lithium compound in an amount of 1 to 30% by weight based on the weight of said mixture;

(3) compression-molding the water-containing mixture to form a molded product having a molding density of not less than 1.5 g/cc; and (4) calcining the obtained, molded product at a temperature of 600 to 850° C.

2. A process according to claim 1, wherein the mixing ratio of said cobalt oxide to said lithium compound is 0.98:1 to 1.05:1, calculated as a molar ratio of cobalt to lithium.

3. A process according to claim 1, wherein the calcining time of the mixture is 2 to 10 hours.

4. A process according to claim 1, wherein said lithium compound is at least one compound selected from the group consisting of lithium carbonate, lithium oxide, lithium hydroxide and lithium hydroxide hydrate.

5. A process according to claim 1, wherein said cobalt oxide having a BET specific surface area of 30 to 200 $m^2/g$ is produced by calcining cobalt oxide hydroxide particles at a temperature of 300 to 500° C.

6. A process according to claim 5, wherein the calcining time of said cobalt oxide hydroxide particles is 15 minutes to 2 hours.

7. A process according to claim 1, wherein said cobalt oxide having an average particle size of not more than 0.1 $\mu m$ is produced by neutralizing an aqueous cobalt salt solution with an aqueous alkaline solution containing an excess amount of alkali to form a suspension containing cobalt hydroxide and having a concentration ratio of alkali to cobalt ($R=[OH^-]/2[Co^{2+}]$) of 1.0 to 1.2 and an alkali concentration of not more than 1.0 M, and then passing an oxygen-containing gas therethrough to oxidize cobalt ions therein, while heating said suspension at a temperature of not less than 60° C.

8. A process according to claim 7, wherein the heating temperature of said suspension is 70 to 100° C.

9. A process according to claim 1, wherein the molding density of said molded product is not more than 5 g/cc.

* * * * *